W. M. WILLIAMS.
DISTRIBUTING MECHANISM FOR HAY LOADERS FOR WAGONS.
APPLICATION FILED JUNE 28, 1919.
1,353,201. Patented Sept. 21, 1920.
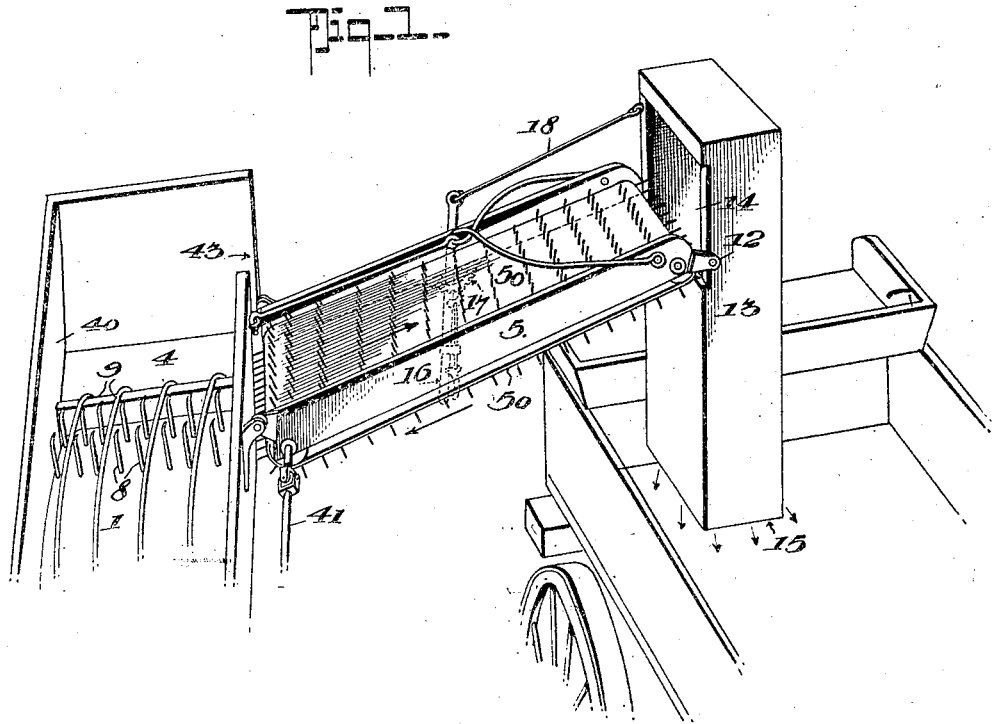
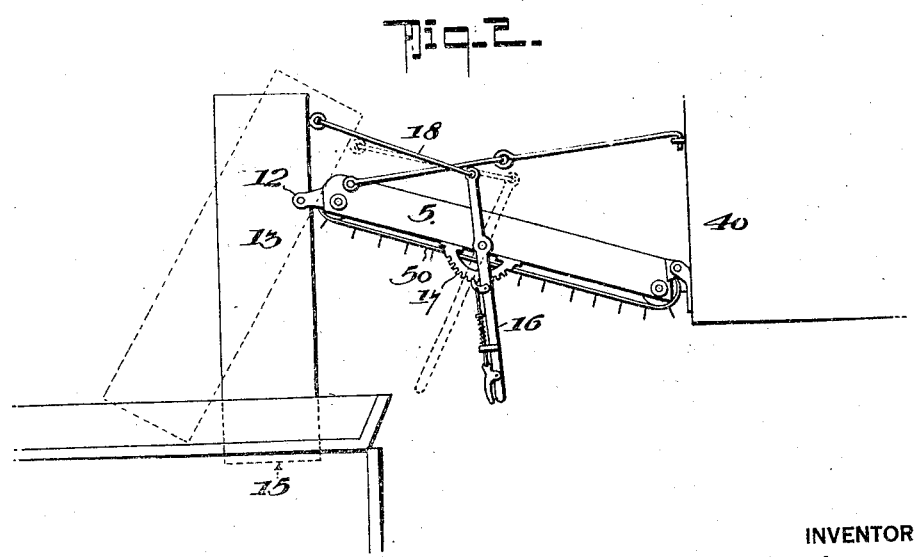
INVENTOR
W. M. Williams
BY
Fred G. Dieterich
ATTORNEYS

UNITED STATES PATENT OFFICE.

WILLIAM M. WILLIAMS, OF RENO, NEVADA, ASSIGNOR OF ONE-EIGHTH TO WILLIAM DAWSON, OF RENO, NEVADA.

DISTRIBUTING MECHANISM FOR HAY-LOADERS FOR WAGONS.

1,353,201.     Specification of Letters Patent.     Patented Sept. 21, 1920.

Substitute for application Serial No. 11,576, filed March 2, 1915. This application filed June 28, 1919. Serial No. 307,303.

*To all whom it may concern:*

Be it known that I, WILLIAM M. WILLIAMS, a citizen of the United States, residing at Reno, in the county of Washoe and State of Nevada, have invented a new and Improved Distributing Mechanism for Hay-Loaders for Wagons, of which the following is a specification.

My present invention has reference to that class of loading means especially designed for being used in connection with a farm wagon for loading hay, straw and manure from the ground directly into the wagon, and my said invention primarily has for its object to provide, in a loading attachment for wagons of the general character stated, an improved simple and economical construction of distributing means that forms a coöperative part of the loading mechanism and which is especially adapted for distributing the straw, hay or manure picked up by the loading mechanism, evenly into the wagon as the loader picks up the material from the ground and conveys it to the distributing means for being loaded into the wagon.

My invention also embodies the peculiar construction and novel arrangement of the parts hereinafter fully described, specifically pointed out in the appended claims and illustrated in the accompanying drawings, in which:

Figure 1 is a perspective view of my invention so much of a loading wagon being shown as is necessary to illustrate a practical application of my invention.

Fig. 2 is a diagrammatic view in elevation that illustrates the manner of adjusting the discharge chute that the material may be spread over the wagon floor.

My distributing mechanism is especially designed for being used in connection with a loading means which, while being drawn over the field picks up the straw, hay or manure, and conveys it to a trough or receiver from which the collected material is delivered over the side of the wagon.

In the drawing, 1 designates a portion of a pick-up wheel, 40 a box or casing in which the said wheel operates, 8 the pick-up teeth, 9 the clearer teeth, 4 a trough into which the picked up material is conveyed by the wheel 1 and 43 a lateral opening in the trough through which the material is conveyed over the side of the wagon.

My improved distributing mechanism comprises a conveyer 5, the receiving end of which extends into the opening 43 of the trough 4, through which the material is delivered onto an endless belt 50 in practice driven by a shaft 41 to which power is transmitted from a rotatable part of the loading or pick-up means.

13 indicates a shiftable discharge throat pivotally connected as at 12, to the upper end of the conveyer frame, see Fig. 1, and the said throat includes an intake opening 14 at the top and in close proximity to the discharge end of the endless belt 50 and a discharge mouth 15 at the lower end which directs the material into the wagon or other like body.

A hand lever 16 is located at one side of the conveyer 5 and the said lever has a ratchet engagement with a rack 17 that is fixedly held on the conveyer frame. 18 indicates a rod which connects to an extension of the lever 16 and to the upper end of the discharge throat 13, the said rod being so arranged that by the adjustment of the lever 16 the throat 13 may be swung on its pivot 12 to direct the material rearwardly over the wagon floor. This operation may be readily effected by the driver of the wagon and a two-fold function is thereby attained in that an extra operator to spread the collected material in the wagon is not necessary and also that the manure need not be touched by hand.

The subject matter of this application is the same as is contained in my forfeited application Serial No. 11,576, allowed June 10, 1916.

From the foregoing description taken in connection with the accompanying drawing, the complete construction, the manner of operation and the advantages of my invention will be readily understood by those skilled in the art.

What I claim is:

1. The combination with a support, a conveyer connected to the support, a tubular distributer chute pivoted intermediate its ends to the discharge end of the conveyer and having a throatway above the pivotal connection into which the conveyer discharges, a rod and lever connection between said conveyer and distributer for swinging said distributer upon its pivotal axis, and means for securing said connection to hold said distributer in its different positions.

2. In a distributing means for hay loaders, the combination with a support, a conveyer pivotally connected at its receiving end to the support, means connected to the support and to the said conveyer for holding the free end of the conveyer in suspension, a distributer chute open at the bottom, the said chute being pivotally connected at its receiving side to the delivery end of the conveyer and provided with a throatway above its pivotal axis through which the said conveyer discharges, and means connected with the said chute and the conveyer for effecting vertical tilting adjustments of the chute and for holding it at its desired adjustments.

WILLIAM M. WILLIAMS.